(12) United States Patent
Eckhardt

(10) Patent No.: US 8,505,591 B2
(45) Date of Patent: Aug. 13, 2013

(54) APPARATUS FOR INSERTING AIR AND/OR SEALENT INTO A TIRE

(75) Inventor: Arnold Eckhardt, Ranstadt (DE)

(73) Assignee: Sumitomo Rubber Industries Limited, Kobe (JP)

( * ) Notice: Subject to any disclaimer, the term of this patent is extended or adjusted under 35 U.S.C. 154(b) by 315 days.

(21) Appl. No.: 12/976,342

(22) Filed: Dec. 22, 2010

(65) Prior Publication Data

US 2011/0155280 A1    Jun. 30, 2011

(30) Foreign Application Priority Data

Dec. 23, 2009  (DE) .......................... 10 2009 060 272

(51) Int. Cl.
*B65B 31/00* (2006.01)
*B29C 73/16* (2006.01)

(52) U.S. Cl.
CPC .................................... *B29C 73/166* (2013.01)
USPC .................. 141/38; 141/9; 141/100; 141/105

(58) Field of Classification Search
USPC ........................................ 141/9, 38, 100–105
See application file for complete search history.

(56) References Cited

U.S. PATENT DOCUMENTS

| 4,765,367 | A | | 8/1988 | Scott | |
|---|---|---|---|---|---|
| 5,386,857 | A | * | 2/1995 | Fogal et al. | 141/5 |
| 6,019,145 | A | * | 2/2000 | Savidge | 141/38 |
| 6,024,139 | A | * | 2/2000 | McInnes | 141/38 |
| 6,283,172 | B1 | | 9/2001 | Thurner | |
| 6,736,170 | B2 | | 5/2004 | Eriksen et al. | |
| 6,766,834 | B1 | | 7/2004 | Eckhardt | |
| 6,964,284 | B2 | | 11/2005 | Eckhardt | |
| 7,798,183 | B2 | * | 9/2010 | Cegelski et al. | 141/38 |
| 2003/0047652 | A1 | | 3/2003 | Eckhardt | |
| 2003/0056851 | A1 | | 3/2003 | Eriksen et al. | |

(Continued)

FOREIGN PATENT DOCUMENTS

| DE | 195 45 935 A1 | 1/1997 |
|---|---|---|
| DE | 198 46 451 A1 | 4/2000 |

(Continued)

OTHER PUBLICATIONS

International Preliminary Report on Patentability for Application No. PCT/EP2009/004066 dated Dec. 16, 2010.

(Continued)

*Primary Examiner* — Timothy L Maust
(74) *Attorney, Agent, or Firm* — Birch, Stewart, Kolasch & Birch, LLP

(57) ABSTRACT

Apparatus for inserting air and/or sealant into a tire, comprising a container for the sealant having inlet and outlet connected or connectable to a hose whose other end is connectable to a tire to be filled, and means for generating pressure connectable via a switching valve selectably with the inlet of the container or with a hose, of which the other end is connectable to a tire to be filled. The same hose is provided for connecting the means for generating pressure to the tire to be filled and for connecting the outlet of the container and the tire to be filled. The switching valve is configured for providing either a direct fluid connection between the means for generating pressure and the hose or a fluid connection between the means for generating pressure and the inlet of the container and between the outlet of the container and the hose.

17 Claims, 3 Drawing Sheets

(56) References Cited

U.S. PATENT DOCUMENTS

| | | |
|---|---|---|
| 2005/0056358 A1 | 3/2005 | Eriksen et al. |
| 2008/0029181 A1 | 2/2008 | Marini |
| 2008/0098855 A1 | 5/2008 | Cegelski et al. |
| 2010/0101375 A1 | 4/2010 | Yoshida et al. |

FOREIGN PATENT DOCUMENTS

| | | |
|---|---|---|
| DE | 199 48 706 A1 | 7/2000 |
| DE | 101 06 468 A1 | 8/2002 |
| DE | 202 11 295 U1 | 12/2002 |
| DE | 202 12 101 U1 | 1/2003 |
| DE | 20 2007 016 242 U1 | 3/2008 |
| DE | 102007003667 A1 | 7/2008 |
| EP | 1 291 158 A1 | 3/2003 |
| EP | 0 938 408 B1 | 4/2003 |
| EP | 1 358 996 A1 | 11/2003 |
| EP | 1 463 626 B1 | 10/2004 |
| EP | 1 722 961 B1 | 11/2006 |
| EP | 1 894 707 A1 | 3/2008 |
| EP | 1 723 016 B1 | 4/2009 |
| EP | 2 067 674 A1 | 6/2009 |
| EP | 1 961 632 B1 | 4/2010 |
| WO | WO 99/14031 A1 | 3/1999 |
| WO | WO 00/21875 A1 | 4/2000 |
| WO | WO 02/058926 | 8/2002 |
| WO | WO 03/004328 A1 | 1/2003 |
| WO | WO 2004/041649 A1 | 5/2004 |
| WO | WO 2005/085028 A1 | 9/2005 |
| WO | WO 2007/102066 A2 | 9/2007 |
| WO | WO 2008/001179 A2 | 1/2008 |
| WO | WO 2008/035163 A2 | 3/2008 |
| WO | WO 2008/075719 A1 | 6/2008 |
| ZA | 96/5816 | 1/1997 |

OTHER PUBLICATIONS

International Search Report, dated Jan. 21, 2010, for Application No. PCT/EP2009/004066.

Extended European Search Report for corresponding Application No. 10015197.6 dated Jan. 7, 2013 (with English translation).

* cited by examiner

APPARATUS FOR INSERTING AIR AND/OR SEALENT INTO A TIRE

The present invention relates to an apparatus for inserting air and/or sealant into a tire, in particular vehicle tire, comprising a container for the sealant, having an inlet and an outlet, wherein the outlet is connected or connectable to a hose of which the other end is connectable to a tire to be filled and a means for generating pressure, in particular an electrical pump or compressor, which is connectable by a switching valve selectably with the inlet of the container or with a hose, of which the other end is connectable to a tire to be filled.

Such an apparatus can be carried along in a vehicle as a so-called repair kit, as a replacement for a spare wheel. Due to the switching valve such repair kits can either only be used for inflating a tire or be used for sealing and subsequently inflating a tire. In dependence whether a tire should only be inflated or both be sealed and also inflated either the hose connected to the container or the hose connected to the means for generating pressure are connected to the valve of the tire by the user. In this respect the problem arises that the user, on the one hand, has to put the switching valve into the correct position and simultaneously connect the correct hose, i.e. either the air conveying hose or the hose for the sealing means to the tire. For this reason there is a need for the improvement of the handling of apparatuses of the aforementioned kind.

The object is satisfied by an apparatus having the features of claim 1.

In accordance with the invention for the connection between the means for generating pressure and the tire to be filled, on the one hand, as well as between the outlet of the container and the tire to be filled, on the other hand, the same hose is provided, wherein the switching valve is configured for providing, depending on its position, either a direct fluid connection between the means for generating pressure and the hose or a fluid connection between the means for generating pressure and the inlet of the container, on the one hand, and between the outlet of the container and the hose, on the other hand.

In dependence on the switch position the switching valve thus either causes a direct air passage from the means for generating pressure in the hose—without a diversion through the container—or an air supply into the container which results in a release of sealant from the container into the hose. On a direct air passage, pressurized air exits from the hose end without sealant, so that the apparatus can be used in the corresponding switch position purely for the inflation of a tire which is intact. On a diversion of the air flow generated by the means for generating pressure through the container, sealant is pressed out of the container into the hose, which is why the apparatus can be used in this switch position for the sealing of a flat tire and for the inflation of a flat tire. Because one and the same hose can be used for both modus operandi of the apparatus—"only inflating" and "sealing and inflating"—the handling is simplified, as the user only has to take care of the actuation of the switching valve and not take care of the selection of the correct hose. Furthermore, material, weight and production costs can be saved by the omission of a hose. In particular, the apparatus can also be configured more space-savingly which is of particular importance with regard to the accommodation in the trunk of a vehicle.

In accordance with an embodiment, the switching valve is configured as a 4/2 way valve, this means that the switching valve has four connections and two switch positions. Using such a valve the air from the means for generating pressure can be selectively guided through a first flow path to the hose or through a second flow path to the hose. Preferably, the way valve is manually operated. However, also an electric way valve, a pneumatic way valve or a hydraulic way valve can be used.

In accordance with a further embodiment an extraction unit is provided, in which the switching valve is integrated, which extraction unit is preferably releasably connected to the container, in particular is an extraction unit which can be screwed onto the container. The extraction unit can, in particular, have a first connection for the inlet of the container, i.e. for the supply of pressurized air, as well as a second connection for the outlet of the container, i.e. for the extraction of the sealant from the container. An empty container can be exchanged in a simple and fast manner in that, for example the emptied container is unscrewed from the extraction unit and a filled container is screwed onto the extraction unit. Through the integration of the switching valve into the extraction unit material, weight, mounting cost and construction space can be saved in contrast to the provision of a separate valve.

Furthermore, the switching valve can include a valve housing having a first connection stub for the connection of the switching valve to the means for generating pressure and a second connection stub for the connection of the switching valve to the hose. The connection stubs can be provided with conventional screw threads, clamping sections or hose junctions. In accordance with an embodiment the valve housing itself forms the extraction unit for the container.

In accordance with a further embodiment, the first connection stub is arranged at the valve housing and is displaced by 180° with respect to the second connection stub which is arranged at the valve housing. This has the advantage that for a direct air passage from the means for generating pressure to the hose, an essentially linear flow is present and thus, an efficient inflation of the tire is ensured.

The switching valve can have a valve seat and a valve body which can be movably arranged in the valve seat, wherein in particular O-rings for the sealing of the transition points between the flow passages of the valve seat and the flow passages of the valve body are provided. In this manner air of relatively high pressure can also be guided reliable from the means for generating pressure to the container and/or to the hose.

In accordance with an embodiment of the invention the valve body is a movable sleeve, in particular a sleeve which is movable transverse to a direct flow direction. Alternatively, the valve body can also be a rotary switch. Both variants ensure a simple handling of the switching valve. Furthermore, also push-button switches, locker switches or such like can be used.

In a factory setting the switching valve is preferably placed into the switching position which provides a direct connection between the means for generating pressure and the hose. The apparatus can be used for inflating a tire without sealing tire in this factory setting. When a sealing of the tire is desired, the switching valve is set from the inflating position into the sealing position, in which the pressurized air is guided through the container. Preferably the switching valve is configured such that on arriving at the sealing position it remains in this, this means that means are provided which prevent a return into the inflation position. For example, the valve body could lock in this sealing position.

In accordance with a further embodiment of the invention the switching valve is arranged at a lower end of the container in an operating position of the apparatus. Through this a preferably complete emptying of the container is supported. In this operating position the container can be arranged lying in the apparatus. To ensure a good emptying of the container also in a lying arrangement of the container, the outlet can be positioned below the container floor in this operating position.

In accordance with a further embodiment a housing for the reception of at least a part of the apparatus components is provided. The housing can, for example be situated at a position in the trunk of a vehicle which is easily accessible. Also the housing can principally be arranged in the operating position of the apparatus.

Further embodiments of the invention can be found in the dependent claims, in the description as well as in the enclosed Figures.

The invention will be described in the following with reference to the drawing by means of an embodiment.

Figure 1:
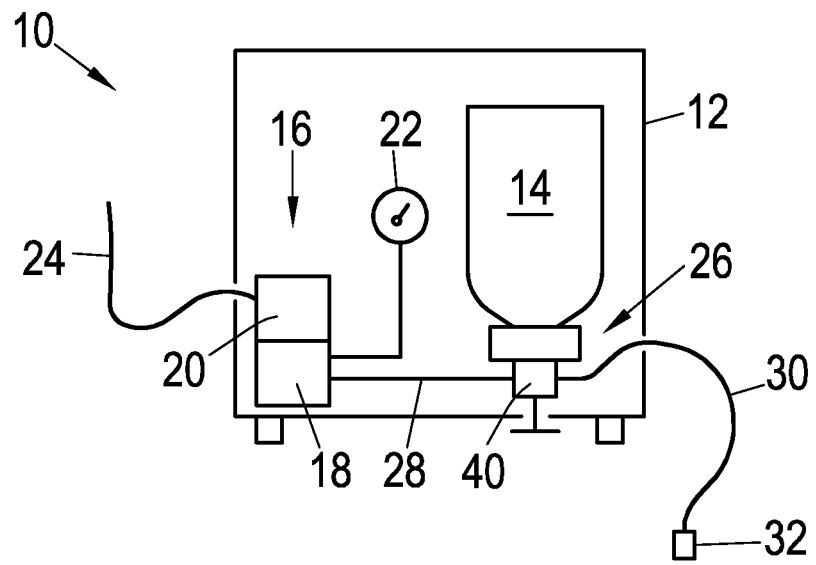
FIG. 1 shows a schematic illustration of an apparatus in accordance with the invention for the insertion of air and/or sealant into a tire.

FIG. 1 schematically shows an apparatus 10 in accordance with the invention in an operating position, which apparatus 10 has a housing 12. A container 14 with sealant is arranged in the housing 12. The housing 12 further includes a compressor unit 16 which comprises a compressor 18 and an electric motor 20 as a drive for the compressor 18. The compressor unit 16 is also provided with a manometer 22 for the display of an air pressure generated by the compressor 18.

Furthermore, the compressor unit 16 includes an electric connection cable 24 via which the compressor unit can be supplied with electric energy, for example from a cigarette lighter of a vehicle. Following the connection of the connection cable 24 to e.g. the cigarette lighter, the electric motor 20 for driving the compressor 18 can be activated by actuating a switch which is not illustrated.

The container 14 has an inlet as well as an outlet which both lead to the extraction unit 26. The extraction unit 26 is screwed onto the bottom end of the container 14 in the operating position, to support a complete emptying of the container 14 on extraction of the sealant.

The compressor 18 is connected to the extraction unit 26 via a supply line 28. Furthermore, a hose 30 is connected to the extraction unit 26 whose other end has a corresponding connection piece 32 for the connection of the hose 30 to a tire valve, for example a so-called VG8 screw fitting.

Figure 2:
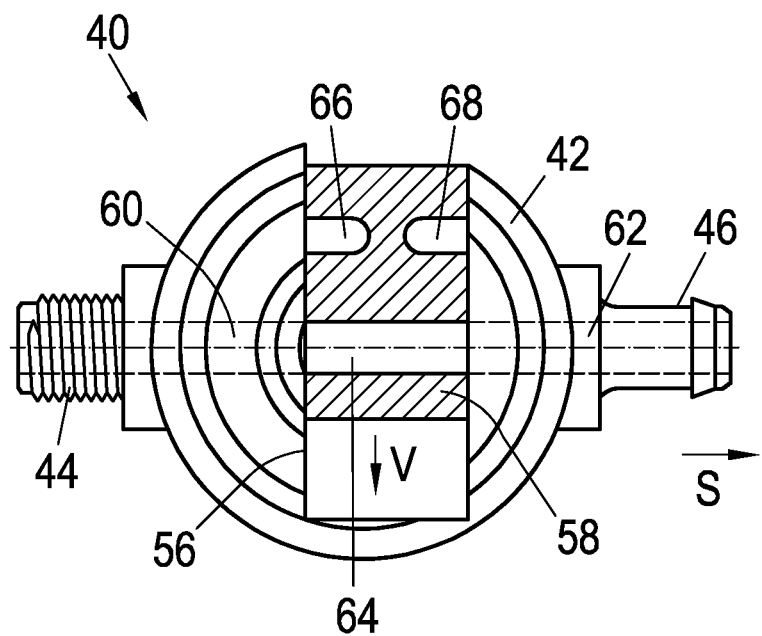
FIG. 2 shows a partially sectioned top view of a switching valve of the apparatus in accordance with FIG. 1 in a first switch position.

In the extraction unit 26 a switching valve 40 is integrated which is illustrated in detail in a top view in FIG. 2. The switching valve 40 includes a valve housing 42 having an input connection stub 44 and an output connection stub 46. As can be seen from FIG. 2 the input connection stub 44 is arranged at the valve housing and is displaced by 180° with regard to the output connection stub 46 arranged at the valve housing 42. In a state ready for operation of the apparatus 10 the input connection stub 44 is connected to the compressor 18 and the output connection stub 46 is connected to the hose 30.

Therefore, in dependence of its switch position the switching valve 40 serves either to provide a direct flow connection between the compressor 18 and the hose 30 or for a flow connection between the compressor 18 and the inlet of the container 14, on the one hand, as well as a connection between the outlet of the container 14 and the hose 30, on the other hand, as will be described below in more detail with additional reference to FIGS. 3 and 4.

The switching valve 40 is configured as a 4/2 way valve and beside the input connection stub 44 and the output connection stub 46 has a container inlet connection stub 48, as well as a container outlet connection stub 50. The container inlet connection stub 48 and the container outlet connection stub 50 are displaced by 90° relative to the input connection stub 44 and the output connection stub 46 at the valve housing 42 and run coaxially interlaced into one another. An also coaxial mantle 52 having an inner thread 54 coaxially arranged to the container inlet connection stub 48 thus, serves to screw the valve housing 42 onto a corresponding thread of the container 14, so that the switching valve 40 finally forms the extraction unit 26. When the valve housing 42 is screwed onto the container 14 both the container inlet connection stub 48 and also the container outlet connection stub 50 are connected to the interior of the container 14. In this respect the container 14 can have an inlet and an outlet separate from the inlet, wherein the inlet is in connection with the container inlet connection stub 48 and the outlet is in connection with the container outlet connection stub 50. Alternatively, the container 14 can also have an opening into which both the container inlet connection stub 48 and also the container outlet stub 50 flow when the valve housing 42 is screwed on and thus simultaneously serve as an inlet and as an outlet. For such a configuration the inlet of the container 14 is thus identical to the outlet of the container 14.

Figure 3:
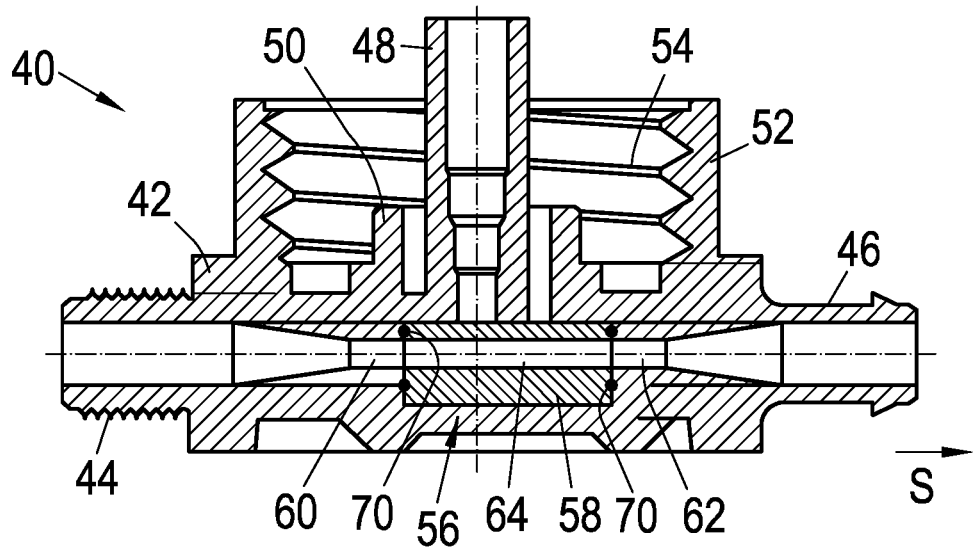
FIG. 3 shows a cross-sectional view of the switching valve in accordance with FIG. 2 in a first switch position.
Figure 4:
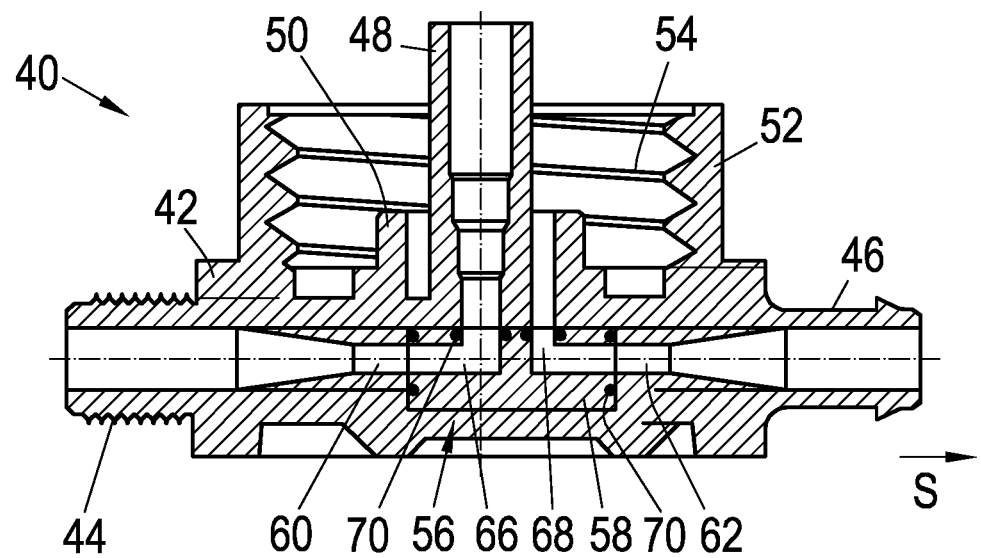
FIG. 4 shows a cross-sectional view of the switching valve in accordance with FIG. 2 in a second switch position.

In the embodiment in accordance with FIGS. 2 to 4 the switching valve 40 has a valve seat 56, as well as a linearly displaceable sleeve 58 arranged in the valve seat 56. In the valve seat 56 a flow passage 60 is formed on the input side and a flow channel 62 is formed on the output side which flow passages are aligned relative to one another and define a direct flow direction S. In the sleeve 58 a passage duct 64 as well as a first diversion passage 66 and a second diversion passage 68 are formed. For the sealing of the transition points between the flow passages 60, 62 of the valve seat 56, on the one hand, and the passage duct 64, as well as the diversion passages 66, 68 of the sleeve 58, on the other hand, O-rings 70 are provided. By actuating a non-illustrated lever or a slide actuator a user can slide this sleeve 58 transverse to the direct flow direction S from a first switch position into a second switch position corresponding to an end stop which is illustrated in FIG. 2 by an arrow V.

In the first switch position illustrated in FIGS. 2 and 3 the flow passages 60, 62 formed in the valve seat 56 are aligned with the passage duct 64 formed in the sleeve 58, so that a direct flow connection having a linear air flow along the direct flow direction S between the compressor 18 and the hose 30 is provided.

In the second switch position illustrated in FIG. 4 a connection between the input side flow passage 60 and the container 14, as well as a connection between the container 14 and the output side flow passage 62 is produced via the diversion passages 66, 68, while the direct flow connection between the compressor 18 and the hose 30 is closed. Thus, in the second switch position the overall air pressure delivered by the compressor 18 is diverted to the inlet of the container 14 by the diversion passage 66. Pressurized air and/or sealant which exits from the container via the outlet is then guided to the hose 30 via the further diversion channel 68.

Following the activation of the electric motor 20 (FIG. 1) the compressor 18 produces an air flow at its output which, depending on the position of the switching valve 40, is either guided directly to the hose 30 or is guided to the hose 30 by including the container 14. If the air flow initially arrives in the container 14, then due to the thereby resulting increase of pressure in the container 14 the sealant together with the air is inserted into a connected leaky tire via the output connection stub 46 and the hose 30, to seal this tire. Subsequently the tire can be inflated with air to set the prescribed tire pressure in this way. However, if the switching valve is set such that the pressurized air delivered by the compressor 18 is directly guided to the hose 30 without this initially arriving at the container 14, then a tire connected to the other end of the hose 30 can thus be inflated with air without the addition of sealant.

The switching valve 40 is set to the first switch position on dispatching thereof, this means that a direct connection between the compressor 18 and the hose 30 is provided. The switching valve 40 is further configured such that the sleeve 58 is locked in the second switch position as soon as it is moved into this.

Figure 5:
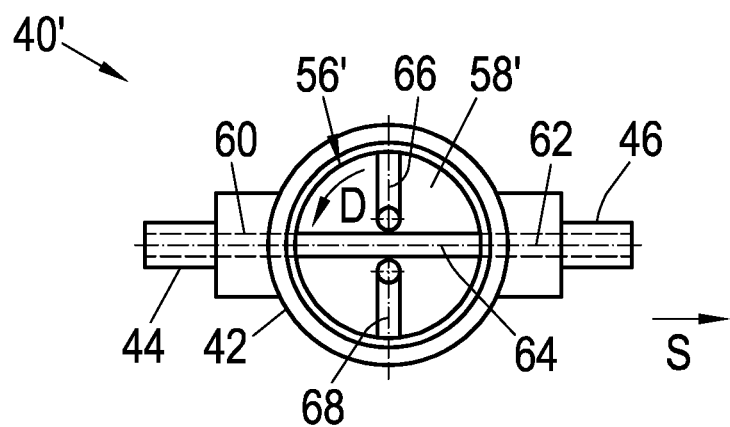
FIG. 5 shows a top view of a switching valve in accordance with an alternative embodiment of the invention in a first switch position.
Figure 6:
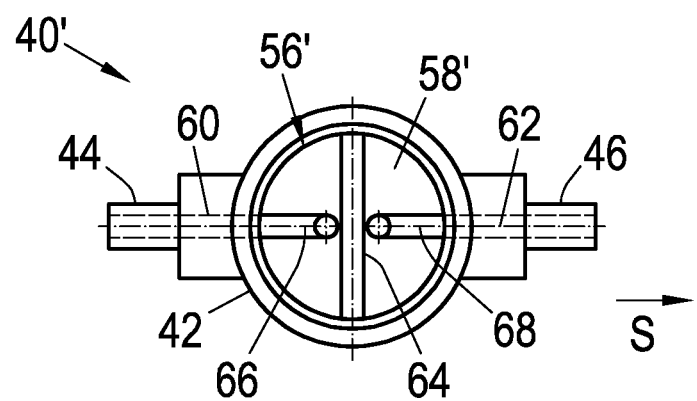
FIG. 6 shows a switching valve in accordance with FIG. 5 in a second switching position.

In the FIGS. 5 and 6 an alternative embodiment of a switching valve 40' is illustrated, wherein similar components are provided with the same reference numerals. The valve body is configured as a rotary switch 58' here. In the first switch position of the switching valve 40' illustrated in FIG. 5, a passage duct 64 of the rotary switch 58' ensures a direct flow connection between the compressor 18 and the hose 30. On rotating the rotary switch 58' in the associated valve seat 56' by 90°—illustrated in FIG. 5 by the arrow D—the switching valve 40' can be set into the second switch position as is illustrated in FIG. 6. In this switching position a diversion of the air provided by the compressor 18 into the container 14 and a diversion of the air exiting from the container 14 and/or sealant exiting from the container 14 into the hose 30 is provided, as was described in connection with the embodiment of FIGS. 2 to 4.

In dependence on the switch position the switching valve 40, 40' can thus either fill a tire to be repaired with sealant and air or a functioning tire can be filled directly with air from the compressor 18. The inflation of the intact tire or the sealing of the leaky tire in this respect takes place with one and the same hose 30, so that the user only has to convey the switching valve 40 into the correct position prior to the operation of the apparatus. In the case of an exchange of the container 14 the extraction unit 26 having the integrated switching valve 40 can principally be used again which is advantageous, in particular from an environmental point of view. Following the renewal of the container 14 following a successful sealing process no new mounting of the compressor 18 in a specialized workshop is required.

List Of Reference Numerals

10 apparatus
12 housing
14 container
16 compressor unit
18 compressor
20 electric motor
22 manometer
24 electric connection cable
26 extraction unit
28 supply tube
30 hose
32 connection piece
40, 40' switching valve
42 valve housing
44 input connection stub
46 output connection stub
48 container inlet connection stub
50 container outlet connection stub
52 mantle
54 inner thread
56, 56' valve seat
58 sleeve
58' rotary switch
60 input side flow passage
62 output side flow passage
64 passage duct
66 bypass passage
68 bypass passage
70 O-ring
S direct flow direction
V displacement
D twist

The invention claimed is:

1. An apparatus for inserting air and/or sealant into a tire, comprising a container for the sealant having an inlet and an outlet, wherein the outlet is connected or connectable to a hose of which the other end is connectable to a tire to be filled, and a means for generating pressure, which is connectable via a switching valve selectably with the inlet of the container or with a hose, of which the other end is connectable to a tire to be filled, wherein the same hose is provided for connecting the means for generating pressure to the tire to be filled, on the one hand, and for connecting the outlet of the container and the tire to be filled, on the other hand, wherein the switching valve is configured for providing, depending on its position, either a direct fluid connection between the means for generating pressure and the hose or a fluid connection between the means for generating pressure and the inlet of the container, on the one hand, and between the outlet of the container and the hose, on the other hand, and wherein the switching valve includes a valve housing having a first connection stub for the connection of the switching valve to the means for generating pressure and a second connection stub for the connection of the switching valve to the hose, the first connection stub being arranged at the valve housing and being displaced by 180° with respect to the second connection stub arranged at the valve housing.

2. An apparatus in accordance with claim 1 wherein the switching valve is configured as a 4/2 way valve.

3. An apparatus in accordance with claim 1 wherein an extraction unit is provided in which the switching valve is integrated.

4. An apparatus in accordance with claim 3 wherein said extraction unit is releasably connected to the container.

5. An apparatus in accordance with claim 3 wherein said extraction unit can be screwed onto the container.

6. An apparatus in accordance with claim 1 wherein the switching valve has a valve seat and a valve body which is moveably arranged in the valve seat, wherein O-Rings are provided for the sealing of transition points between the flow passages of the valve seat and flow passages of the valve body.

7. An apparatus in accordance with claim 6 wherein the valve body is a moveable sleeve.

8. An apparatus in accordance with claim 7 wherein said sleeve is moveable transverse to a direct flow direction.

9. An apparatus in accordance with claim 6 wherein the valve body is a rotary switch.

10. An apparatus in accordance with claim 1 wherein the switching valve is placed into the switching position in a factory setting which provides a direct connection between the means for generating pressure and the hose.

11. An apparatus in accordance with claim 10 wherein the switching valve is configured such that on arriving at a different switch position it remains in that switch position.

12. An apparatus in accordance with claim 1 wherein the switching valve is arranged at a lower end of the container in a position of use of the apparatus.

13. An apparatus in accordance with claim 1 wherein a housing for the reception of at least one part of the apparatus components is provided.

14. An apparatus in accordance with claim 1 wherein said tire is a vehicle tire.

15. An apparatus in accordance with claim 1 wherein said means for generating pressure is either an electrical pump or a compressor.

16. The apparatus of claim 1, wherein said tire is a vehicle tire.

17. The apparatus of claim 1, wherein said means for generating pressure is an electrical pump or compressor.

* * * * *